(12) United States Patent
Park et al.

(10) Patent No.: US 11,131,647 B2
(45) Date of Patent: *Sep. 28, 2021

(54) ION-SENSITIVE FIELD-EFFECT TRANSISTOR WITH SAWTOOTH WELL TO ENHANCE SENSITIVITY

(71) Applicant: INTERNATIONAL BUSINESS MACHINES CORPORATION, Armonk, NY (US)

(72) Inventors: Chanro Park, Clifton Park, NY (US); Kangguo Cheng, Schenectady, NY (US); Juntao Li, Cohoes, NY (US); Ruilong Xie, Niskayuna, NY (US)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/352,107

(22) Filed: Mar. 13, 2019

(65) Prior Publication Data

US 2020/0292491 A1    Sep. 17, 2020

(51) Int. Cl.
*G01N 27/414* (2006.01)
(52) U.S. Cl.
CPC ................. *G01N 27/4148* (2013.01)
(58) Field of Classification Search
CPC ............. G01N 27/4148; H01L 21/823493
See application file for complete search history.

(56) References Cited

U.S. PATENT DOCUMENTS

| | | | |
|---|---|---|---|
| 7,211,459 | B2 | 5/2007 | Yang |
| 7,321,143 | B2 | 1/2008 | Kunath et al. |
| 8,642,371 | B2 | 2/2014 | Mohajerzadeh et al. |
| 8,747,748 | B2 | 6/2014 | Li et al. |
| 9,835,585 | B2 | 12/2017 | Fife et al. |
| 9,995,708 | B2 | 6/2018 | Fife et al. |
| 2010/0237467 | A1* | 9/2010 | Dalton ............... H01L 28/20 257/536 |
| 2010/0273672 | A1 | 10/2010 | Demoustier-Champagne et al. |
| 2013/0189158 | A1* | 7/2013 | Li ............... C12Q 1/6869 422/82.01 |
| 2014/0061729 | A1* | 3/2014 | Koo ............... G01N 27/4148 257/253 |
| 2014/0367748 | A1* | 12/2014 | Dalton ............ G01N 27/414 257/253 |
| 2017/0030854 | A1 | 2/2017 | Buie et al. |
| 2018/0052132 | A1 | 2/2018 | Santangelo et al. |

* cited by examiner

*Primary Examiner* — Steven H Loke
*Assistant Examiner* — Juanita B Rhodes
(74) *Attorney, Agent, or Firm* — Tutunjian & Bitetto, P.C.; Randall Bluestone

(57) ABSTRACT

A method for fabricating a semiconductor device including an ion-sensitive field-effect transistor (ISFET) with enhanced sensitivity includes forming a sawtooth microwell within a base structure formed on a semiconductor chip corresponding to an ISFET, including using a sawtooth mask to etch through the base structure to expose the semiconductor chip, removing the sawtooth mask, and forming a sawtooth macrowell from the sawtooth microwell.

20 Claims, 10 Drawing Sheets

ION-SENSITIVE FIELD-EFFECT TRANSISTOR WITH SAWTOOTH WELL TO ENHANCE SENSITIVITY

BACKGROUND

The present invention generally relates to semiconductor devices, and more particularly to ion-sensitive field-effect transistors (ISFETs) with sawtooth wells to enhance sensitivity and methods of forming the same.

An ion-sensitive field-effect transistor (ISFET) is a transistor that can be used to measure ion concentration in a solution. More specifically, the ion concentration can be measured based on current flowing through the ISFET, which can change in accordance with changes in ion concentration. The solution can be separated from the channel by an ion-sensitive barrier and a gap that allows a substance under test to come in contact with the sensitive barrier. A threshold voltage of the ISFET can depend on the acidity/basicity (e.g., pH) of the substance under test in contact with the ion-sensitive barrier. Electrical charge can be measured by a change in the threshold voltage of the ISFET to sense analyte solution (e.g., bio or chemical) in the well of the ISFET. ISFETs can be fabricated along with metal-oxide semiconductor FETs (MOSFETs) to make "lab-on-chip" devices in which the ISFETs are used as sensors (e.g., biosensors and/or chemical sensors) and the MOSFETs are used for signal processing.

SUMMARY

In accordance with an embodiment of the present invention, a method for fabricating a semiconductor device including an ion-sensitive field-effect transistor (ISFET) with enhanced sensitivity is provided. The method includes forming a sawtooth microwell within a base structure formed on a semiconductor chip corresponding to an ISFET. Forming the sawtooth microwell includes using a sawtooth mask to etch through the base structure to expose the semiconductor chip. The method further includes removing the sawtooth mask, and forming a sawtooth macrowell from the sawtooth microwell.

In accordance with another embodiment of the present invention, a method for fabricating a semiconductor device including an ion-sensitive field-effect transistor (ISFET) with enhanced sensitivity is provided. The method includes forming a base structure on a semiconductor chip corresponding to an ISFET. Forming the base structure includes forming a protection layer on the semiconductor chip, and forming a dielectric layer on the protection layer. The method further includes forming a sawtooth microwell within the base structure. Forming the sawtooth microwell includes using the sawtooth mask to etch through the base structure to expose the semiconductor chip by etching the dielectric layer to create dielectric layer portions, stopping on the protection layer, and etching the protection layer. The method further includes removing the sawtooth mask, and forming a sawtooth macrowell from the sawtooth microwell.

In accordance with yet another embodiment of the present invention, a semiconductor device including an ion-sensitive field-effect transistor (ISFET) with enhanced sensitivity is provided. The device includes a semiconductor chip, first and second protection layers disposed on the semiconductor chip, first and second dielectric layer portions disposed on the first and second protection layers, respectively, and a sawtooth macrowell disposed between the first and second dielectric layer portions.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
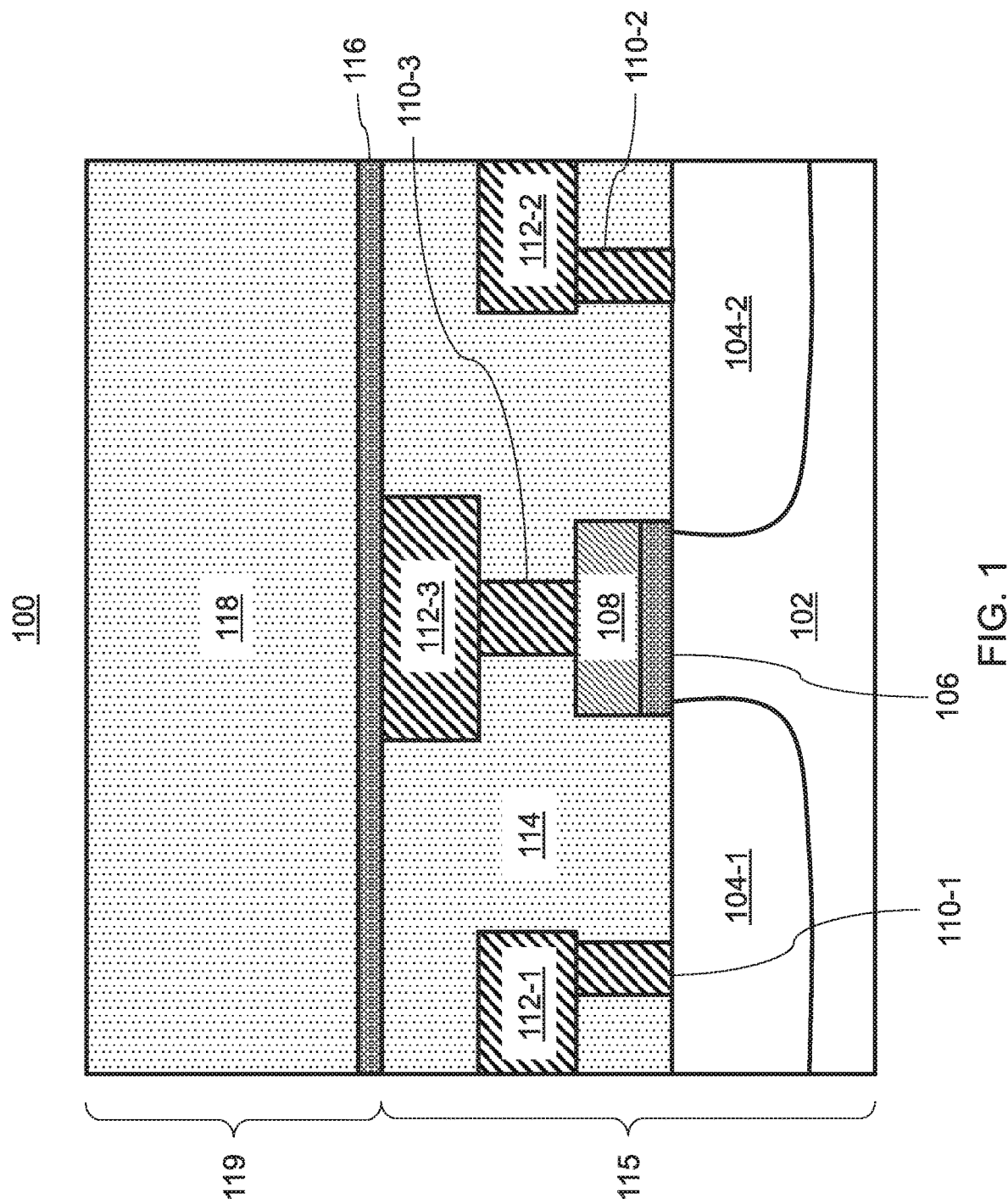
FIG. 1 is a cross-sectional view of a base structure formed during the fabrication of a semiconductor device, in accordance with an embodiment of the present invention.

The embodiments described herein provide for a ion-sensitive field-effect transistor (ISFET) having a sawtooth microwell. The use of passivation layer can be needed between an analyte solution and the gate, as opposed to the analyte solution directly contacting the gate. However, the use of the passivation layer can reduce the sensitivity of the ISFET. To enhance the sensitivity of the ISFET, the sawtooth microwell formed in accordance with the embodiments described herein can be used to increase total capacitor surface area.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, a cross-sectional view of a semiconductor device 100 is provided. Illustratively, as will be described in FIGS. 1-9, the device 100 can include an ISFET.

As shown, the device 100 includes a substrate 102. The substrate 102 can include any suitable substrate structure, e.g., a bulk semiconductor, a semiconductor-on-insulator (SOI) substrate, etc. In one example, the substrate 102 can include a silicon-containing material. Illustrative examples of Si-containing materials suitable for the substrate 102 can include, but are not limited to, Si, SiGe, SiGeC, SiC and multi-layers thereof. Although silicon is the predominantly used semiconductor material in wafer fabrication, alternative semiconductor materials can be employed as additional layers, such as, but not limited to, germanium, gallium arsenide, gallium nitride, silicon germanium, cadmium telluride, zinc selenide, etc.

As further shown, source/drain regions 104-1 and 104-2 are formed on the substrate 102. The source/drain regions 104-1 and 104-2 can be formed using any suitable process in accordance with the embodiments described herein. In one embodiment, the source/drain regions 104-1 and 104-2 can include n-type doped regions forming an n-type FET (NFET). In another embodiment, the source/drain regions 104-1 and 104-2 can include p-type doped regions forming a p-type FET (PFET).

As further shown, a gate dielectric layer 106 is formed on the substrate between the source/drain regions 104-1 and 104-2, and a gate conductor layer 108 is formed on the gate dielectric layer 106. The gate dielectric layer 106 and the gate conductor layer 108 collectively form what is referred to herein as a gate structure.

The gate dielectric layer 106 can include any suitable dielectric material in accordance with the embodiments described herein. In one embodiment, the gate dielectric layer 106 can include a high-k dielectric material. As used herein, a high-k dielectric material refers to a dielectric material having a dielectric constant (k) higher than the dielectric constant of silicon oxide at room temperature (e.g., about 20° C. to about 25° C.) and atmospheric pressure (about 1 atm). For example, a high-k dielectric material can have a dielectric constant greater than 4.0. In another example, the high-k gate dielectric material can have a dielectric constant greater than 7.0. Examples of suitable high-k dielectric materials that the gate dielectric layer 106 can be formed from include, but are not limited to, hafnium oxides, hafnium silicon oxides, hafnium silicon oxynitrides, lanthanum oxides, lanthanum aluminum oxides, zirconium oxides, zirconium silicon oxides, zirconium silicon oxynitrides, tantalum oxides, titanium oxides, barium strontium titanium oxides, barium titanium oxides, strontium titanium oxides, yttrium oxides, aluminum oxides, lead scandium tantalum oxides, lead zinc niobates, etc.

The gate dielectric layer 106 can be formed using any suitable process in accordance with the embodiments described herein. Examples of processes that can be used to form the gate dielectric layer 106 include, but are not limited to, a chemical vapor deposition (CVD) process and/or an atomic layer deposition (ALD) process. Variations of CVD processes suitable for depositing the gate dielectric layer 106 include, but are not limited to, atmospheric pressure CVD (APCVD), low-pressure CVD (LPCVD), plasma-enhanced CVD (PECVD), metalorganic CVD (MOCVD), etc.

The gate conductor layer 108 can include any suitable conductive material in accordance with the embodiments described herein. Example of suitable conductive materials that the gate conductor layer 108 can be formed from include, but are not limited to metals, metal alloys, metal nitrides and metal silicides, as well as laminates thereof and composites thereof. Examples of suitable conductive materials that can be used to form the gate conductor layer include, but are not limited to, doped polycrystalline or amorphous silicon, germanium, silicon germanium, a metal (e.g., tungsten (W), titanium (Ti), tantalum (Ta), ruthenium (Ru), hafnium (Hf), zirconium (Zr), cobalt (Co), nickel (Ni), copper (Cu), aluminum (Al), platinum (Pt), tin (Sn), silver (Ag), gold (Au), a conducting metallic compound material (e.g., tantalum nitride (TaN), titanium nitride (TiN), tantalum carbide (TaC), titanium carbide (TiC), titanium aluminum carbide (TiAlC), tungsten silicide (WSi), tungsten nitride (WN), ruthenium oxide ($RuO_2$), cobalt silicide (CoSi), nickel silicide (NiSi)), transition metal aluminides (e.g. $Ti_3Al$, ZrAl), TaC, TaMgC, carbon nanotube, conductive carbon, graphene, etc. The conductive material can further include dopants that are incorporated during or after deposition.

As another example, the gate conductor layer 108 can include a doped semiconductor material. More specifically, such doped semiconductor materials can include, e.g., doped polysilicon and/or polysilicon-germanium alloy materials having a dopant concentration from, e.g., about $1\times10^{18}$ dopant atoms per cubic centimeter to about $1\times10^{22}$ dopant atoms per cubic centimeter, and/or polycide materials (e.g., doped polysilicon/metal silicide stack materials).

The gate conductor layer 108 can be formed by any suitable process in accordance with the embodiments described herein. Examples of processes that can be used to form the gate conductor layer 108 include, but are not limited to, ALD, CVD, physical vapor deposition (PVD), sputtering, plating, evaporation, ion beam deposition, electron beam deposition, laser assisted deposition, chemical solution deposition, etc. Dielectric spacers (not shown) may present at sidewalls of the gate dielectric layer 106 and/or the gate conductor layer 108.

As further shown, a plurality of contacts are formed, including a source/drain contact 110-1, a drain/source contact 110-2 and a gate contact 110-3. Additionally, back-end-of-line (BEOL) structures 112-1 through 112-3 are formed on contacts 110-1 through 110-3, respectively. The contacts 110-1 through 110-3 and the BEOL structures 112-1 through 112-3 can be formed using any suitable processes, and can include any suitable conductive material, in accordance with the embodiments described herein. Examples of suitable materials that the contacts 110-1 through 110-3 and the BEOL structures 112-1 through 112-3 can be formed from include, but are not limited to, tungsten (W), cobalt (Co), ruthenium (Ru), copper (Cu), etc. In some embodiments, the contacts 110-1 through 110-3 can include a barrier layer (not show) including a barrier material that can prevent diffusion and/or alloying of the conductive metal-containing fill material with an underlying material may be formed into the opening prior to filling the opening with a conductive metal-containing fill material. Examples of suitable barrier materials include, but are not limited to, titanium nitride (TiN), tantalum nitride (TaN), hafnium nitride (HfN), niobium nitride (NbN), tungsten nitride (WN), tungsten carbon nitride (WCN), etc. The barrier layer can be formed in the contact openings by a deposition process such as, for example, chemical vapor deposition (CVD), plasma enhanced chemical vapor deposition (PECVD), atomic layer deposition (ALD), or metalorganic chemical vapor deposition (MOCVD). A planarization process may follow the filling of each opening with the conductive metal-containing fill material.

As further shown, dielectric material 114 is formed. The dielectric material 114 can be formed suing any suitable process, and can include any suitable material, in accordance with the embodiments described herein.

Components 102 through 114 collectively formed what is referred to herein as a semiconductor chip, or integrated circuit, 115.

As further shown, a protection layer 116 is formed on the semiconductor chip 115. The protection layer 116 can be formed using any suitable process, and can include any suitable material, in accordance with the embodiments described herein. For example, the protection layer 116 can include, e.g., a silicon nitride material (e.g., SiN). The protection layer 116 can be a thin protection layer. For example, the protection layer 116 can have a thickness from, e.g., about 3 nm to about 7 nm. More specifically, the protection layer 116 can have a thickness of, e.g., about 5 nm.

As further shown, a dielectric layer 118 is formed on the protection layer 116. The dielectric layer 116 can be formed suing any suitable process, and can include any suitable material, in accordance with the embodiments described herein. For example, the dielectric layer 116 can include, e.g., $SiO_2$.

The protection layer 116 and the dielectric layer 118 collectively form what is referred to herein as a base structure 119.

Figure 2:
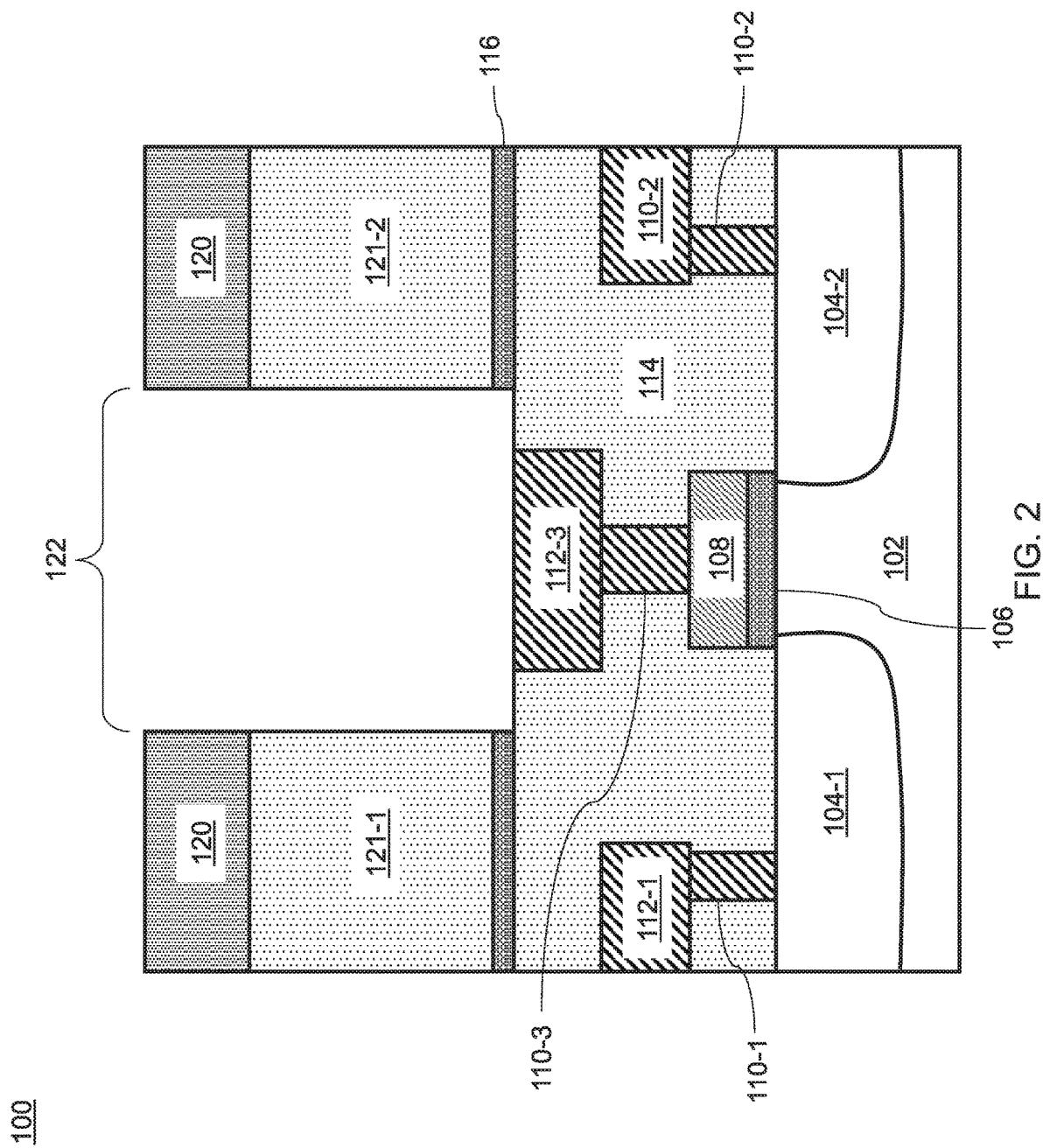
FIG. 2 is a cross-sectional view of the formation of a sawtooth microwell during the fabrication of the semiconductor device, in accordance with an embodiment of the present invention.

With reference to FIG. 2, a sawtooth mask 120 is used to form a sawtooth microwell 122 within the base structure 119. As will be described in further detail below with reference to FIG. 3, the sawtooth mask 120 can include micropillars each forming a sawtooth at the edges of the mask 120. The sawtooth microwell 122 can be formed by using the sawtooth mask 120 to etch through the dielectric layer 118, stopping on the protection layer 116, and then etching the protection layer 116. The etching through of the dielectric layer 118 creates dielectric layer portions 121-1 and 121-2. Further details regarding the sawtooth mask 120 will now be described below with reference to FIG. 3.

Figure 3:
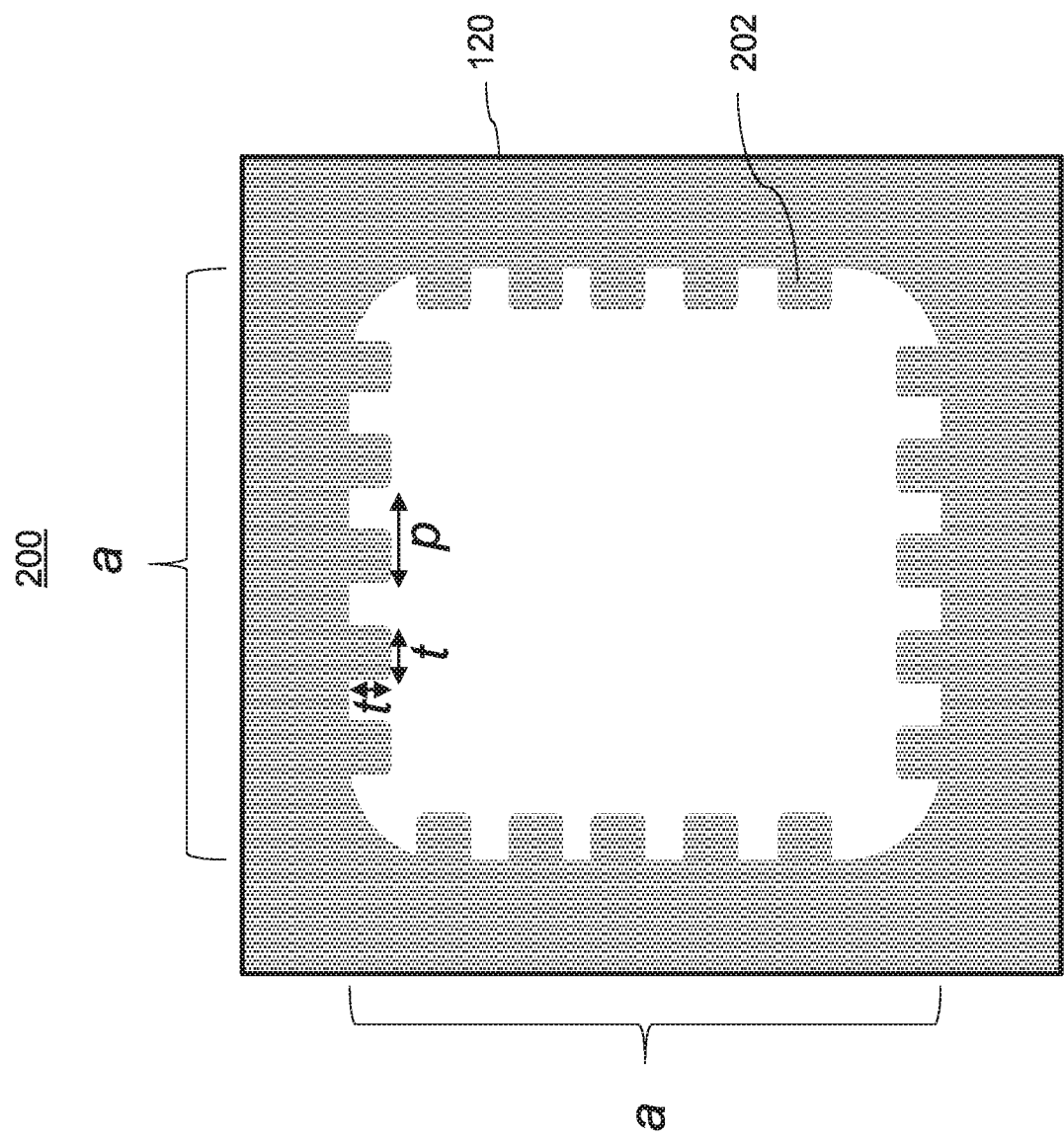
FIG. 3 is a diagram of a sawtooth mask used to form the sawtooth microwell of FIG. 2, in accordance with an embodiment of the present invention.

With reference to FIG. 3, a diagram 200 is provided illustrating a top-down view of the mask 120 shown in FIG. 2. As shown, the sawtooth mask 120 is designed to include micropillars forming "teeth" along the mask edge, including sawtooth 202. As will be described in further detail below, the sawtooth geometry of the sawtooth mask 120 can increase capacitor surface area as compared to non-sawtooth mask geometries (e.g., regular square shape mask geometries).

To show the increase in capacitor surface area, assume that a sawtooth microwell formed with the sawtooth mask 120 is a cubic well having an edge length "a", each sawtooth is a square having a side length "t", and a pitch "p" exists between adjacent ones of the teeth.

For a non-sawtooth mask having edges forming a square, the total capacitor surface area can be represented as $5a^2$ (e.g., four sides of the well plus the bottom surface). However, for the sawtooth mask 120, the capacitor surface area for each of the sides can be represented as $a^2[1+(2t/p)]$, and the capacitor surface area for the bottom can be represented as $a^2-4at^2/p$. That is, the total capacitor surface area can be represented as $4a^2[1+(2t/p)]+a^2-4at^2/p$ (e.g., the four sides of the well plus the bottom). Accordingly, if p is twice the side length t, such that p=2t, the total $4a^2[1+(2t/p)]+a^2-4at^2/p$ reduces to $9a^2-2at$.

For the sake of illustration, assume that a=10 μm, t=1 μm and p=2 μm. For the non-sawtooth mask, the total capacitor area would be equal to $5(10)^2$ μm² =500 μm². However, for the sawtooth mask 120, the total capacitor area would be equal to $[9(10)^2-2(10)(1)]$ μm²=880 μm². Thus, the sawtooth mask 120 having these dimensions can increase the total capacitor surface area by 380 μm² over a non-sawtooth mask having edges forming a square, which corresponds to a 76% increase in total capacitor surface area.

As will be described in further detail below, sensitivity can be enhanced due to the increased capacitor surface area achieved by the sawtooth geometry. More specifically, the increased capacitor surface area corresponds to an increase in passivation capacitance ($C_p$). For example, assuming that a FET capacitance ($C_{FET}$) is ten times that of $C_p$ without the sawtooth microwell, a sensitivity enhancement of, e.g., about 1.5 fold can be achieved based on a capacitance increase of $C_p$ of, e.g., about 1.6 fold.

Figure 4:
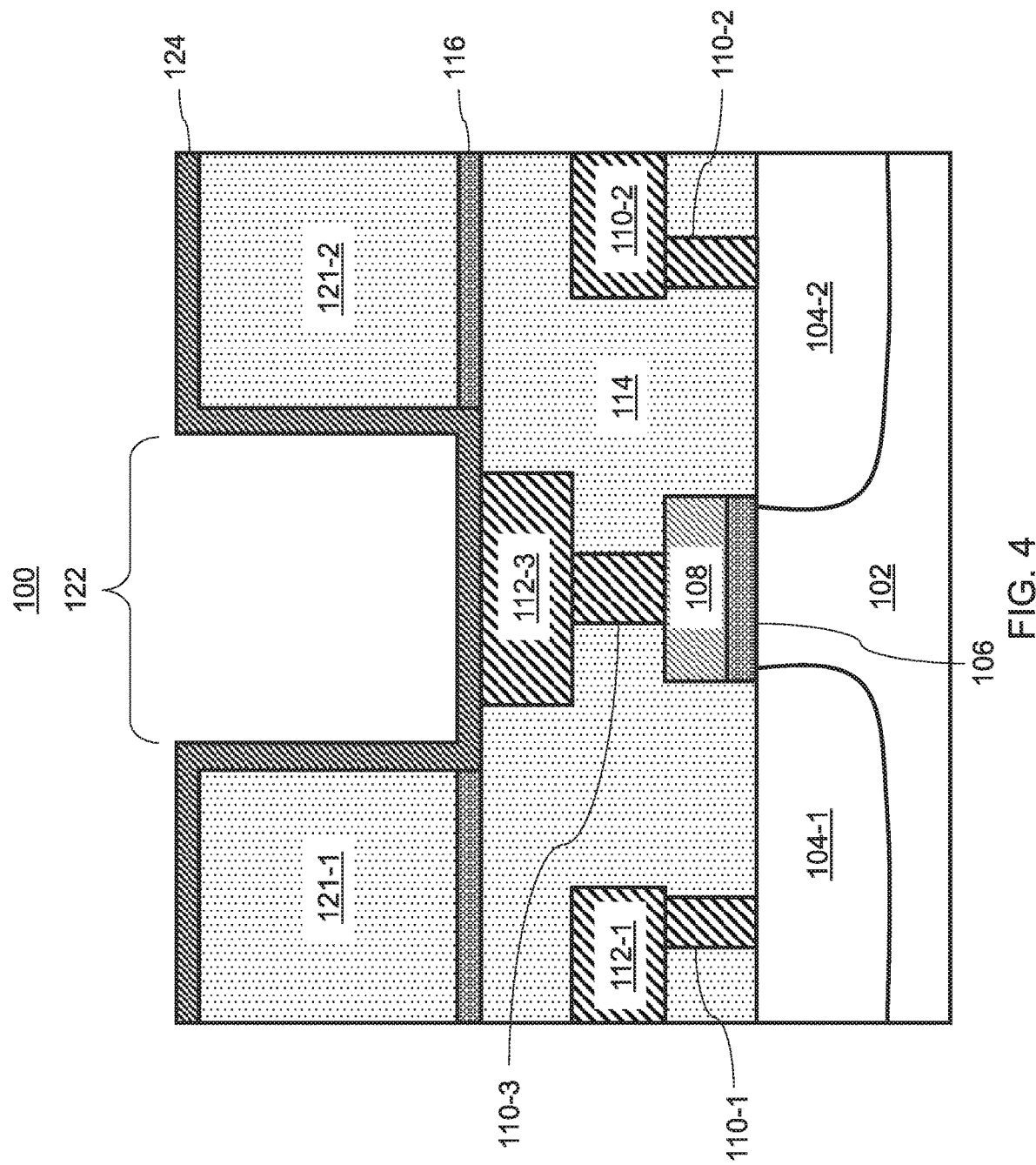
FIG. 4 is a cross-sectional view of removal of a mask from the base structure and the formation of a conductive layer during the fabrication of the semiconductor device, in accordance with an embodiment of the present invention.

With reference to FIG. 4, the sawtooth mask 120 is removed (e.g., stripped), and a conductive layer 124 is formed along exposed surfaces of the device 100. For example, the conductive layer 124 can be conformally deposited along the exposed surfaces of the dielectric material 114, the dielectric layer portions 121-1 and 121-2, the BEOL structure 112-3 and the protection layer 116.

The conductive layer 124 can include any suitable conductive material (e.g., metal) in accordance with the embodiments described herein. Examples of suitable materials that the conductive layer 124 can be formed from include, but are not limited to, ruthenium (Ru), gold (Au), platinum (Pt), palladium (Pd), nickel (Ni), cobalt (Co), aluminum (Al), silver (Ag), etc. The conductive layer 124 can be formed using any suitable process in accordance with the embodiments described herein. Examples of suitable processes that can be used to form the conductive layer 124 include, but are not limited to, atomic layer deposition (ALD), chemical vapor deposition (CVD), physical vapor deposition (PVD), etc.

Figure 5:
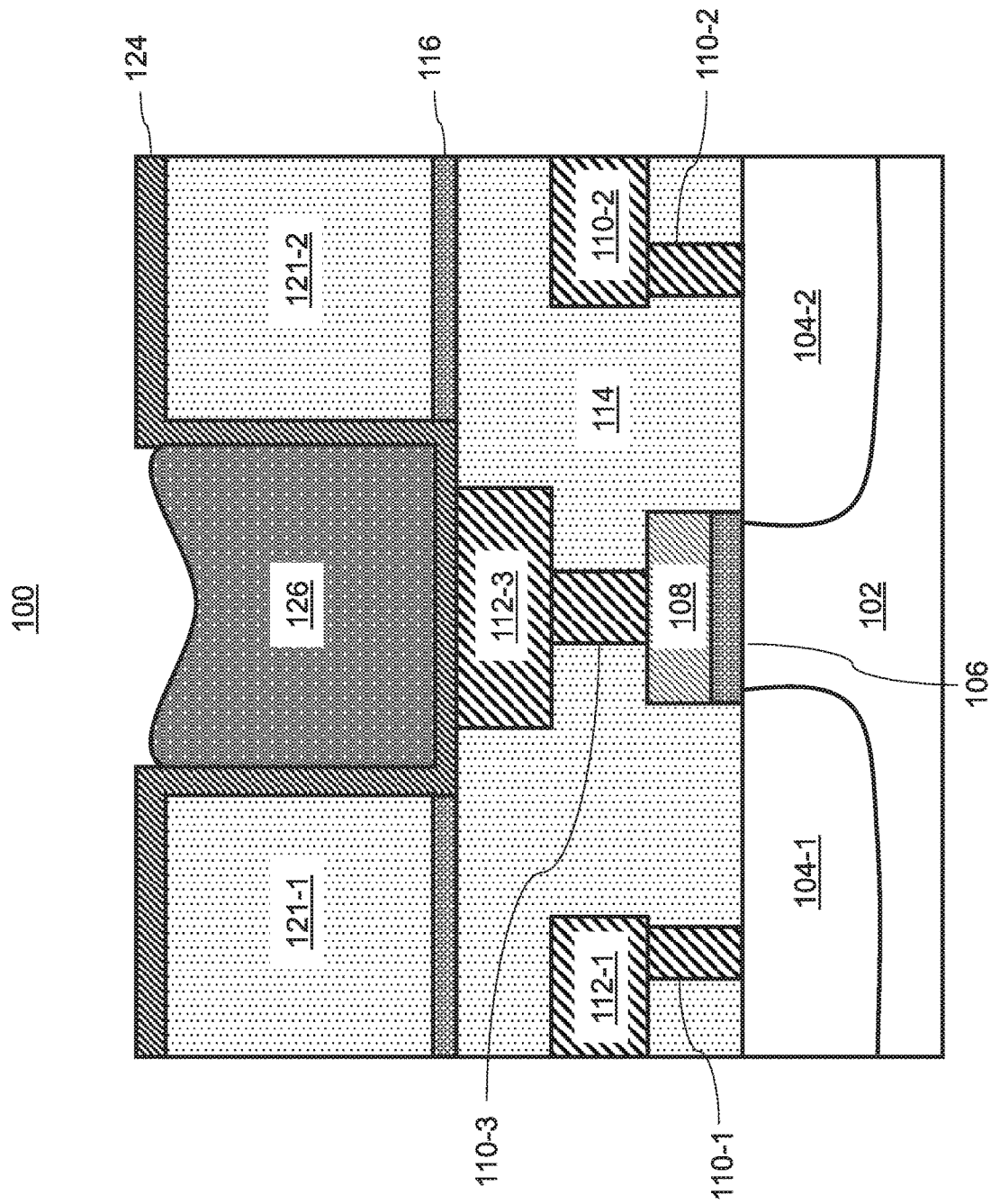
FIG. 5 is a cross-sectional view of the filling of the sawtooth microwell with a sacrificial material during the fabrication of the semiconductor device, in accordance with an embodiment of the present invention.

With reference to FIG. 5, a sacrificial layer 126 is formed within the sawtooth microwell 122. As shown, the sacrificial layer 126 can be formed to a height of the dielectric layer portions 121-1 and 121-2 (e.g., up to the top surfaces of the dielectric layer portions 121-1 and 121-2). The sacrificial layer 126 can be formed by filling the sawtooth microwell 122 with a sacrificial material, and planarizing and recessing the sacrificial layer 126 to the height of the dielectric layer portions 121-1 and 121-2 to expose the portions of the conductive layer 124 disposed on the top surfaces of the dielectric layer portions 121-1 and 121-2. In one embodiment, the sacrificial material 126 can include silicon-germanium (SiGe). For example, the sacrificial material 126 can include, e.g., amorphous SiGe (aSiGe). However, the sacrificial material 126 can include any suitable material in accordance with the embodiments described herein.

Figure 6:
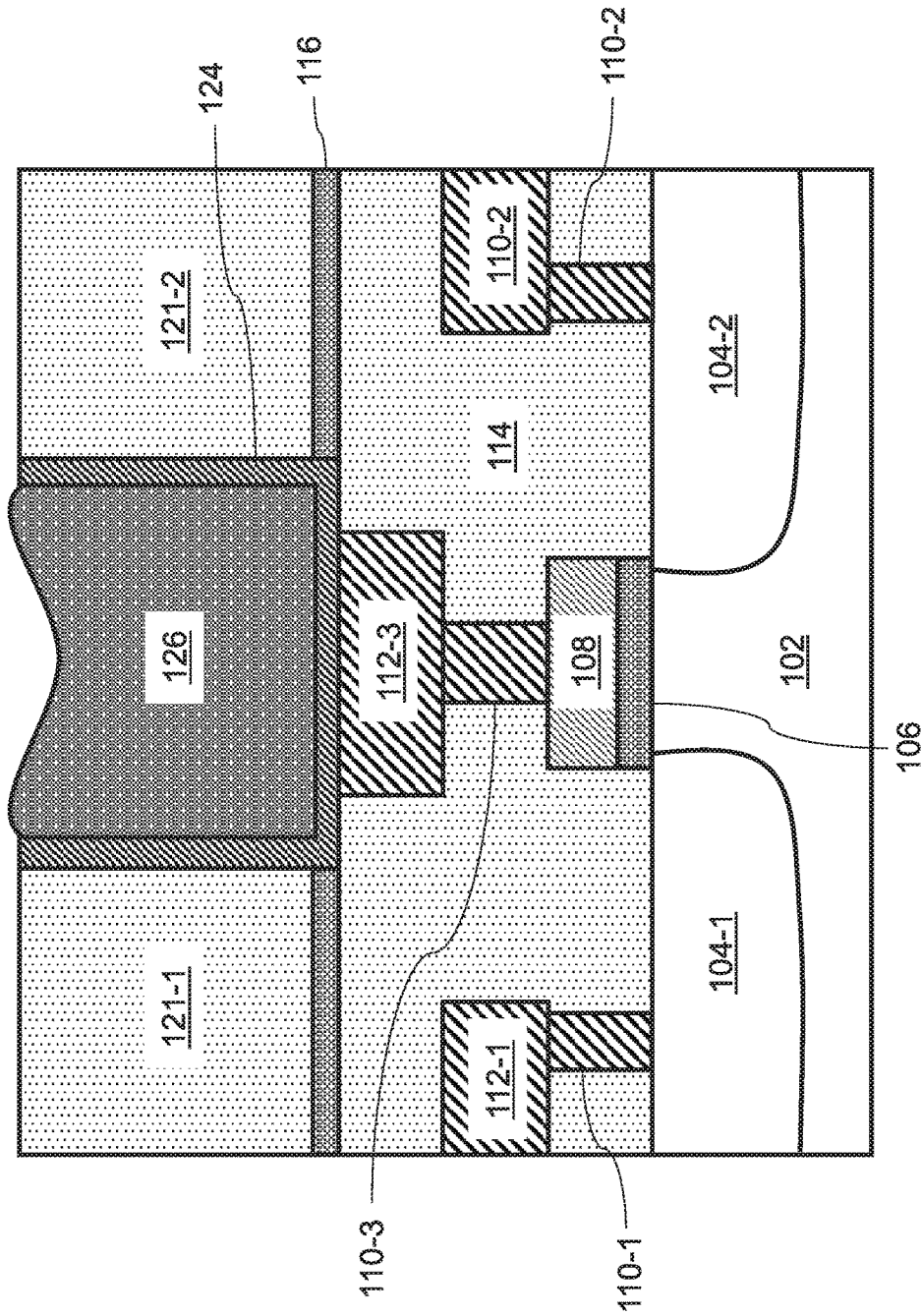
FIG. 6 is a cross-sectional view of the removal of exposed portions of the conductive layer during the fabrication of the semiconductor device, in accordance with an embodiment of the present invention.

With reference to FIG. 6, the exposed portions of the conductive layer 124 are removed. The exposed portions of the conductive layer 124 can be removed using any suitable process in accordance with the embodiments described herein.

Figure 7:
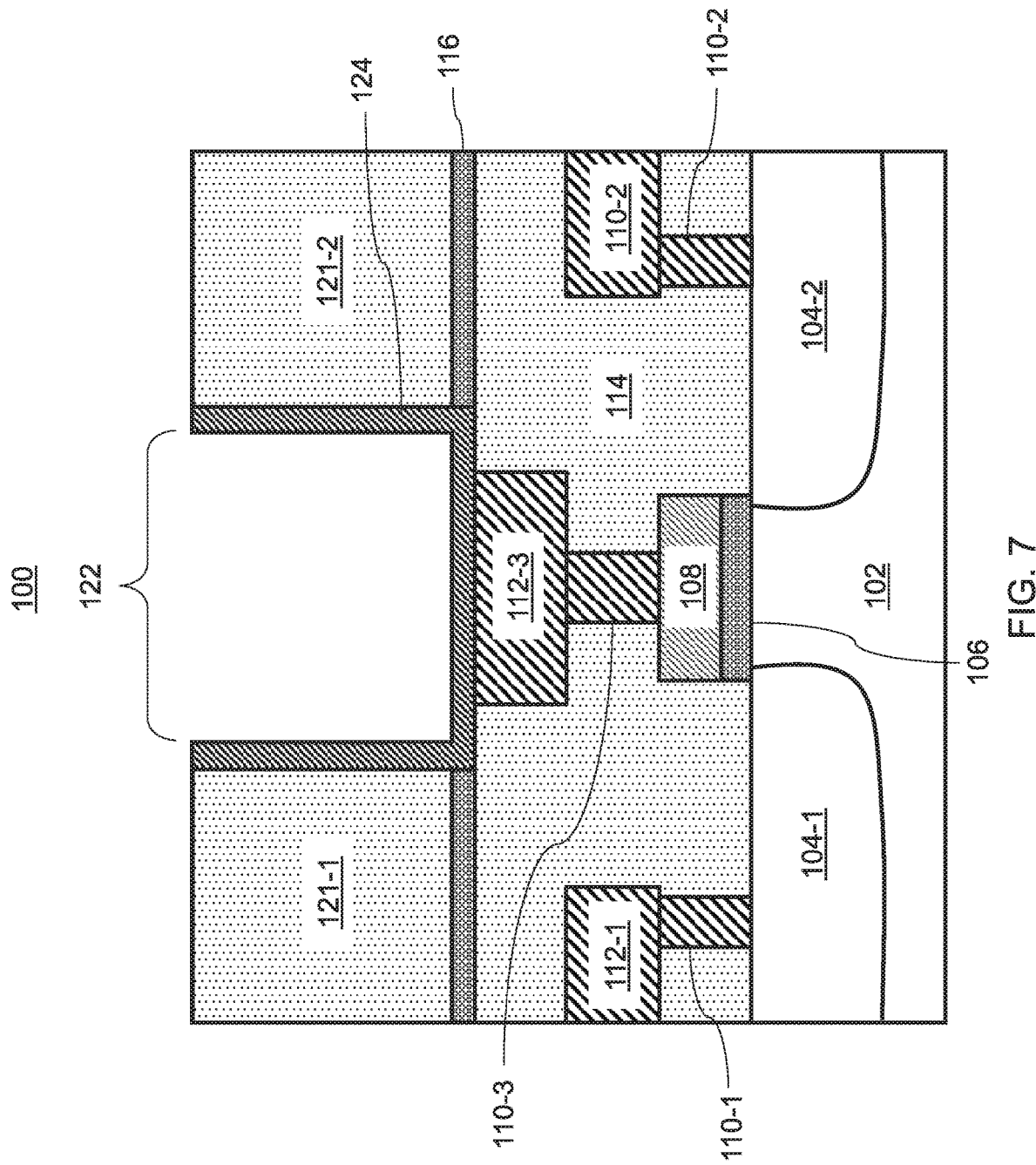
FIG. 7 is a cross-sectional view of the removal of the sacrificial material during the fabrication of the semiconductor device, in accordance with an embodiment of the present invention.

With reference to FIG. 7, the sacrificial layer 126 is removed (e.g., stripped). The sacrificial layer 126 can be removed using any suitable process in accordance with the embodiments described herein.

Figure 8:
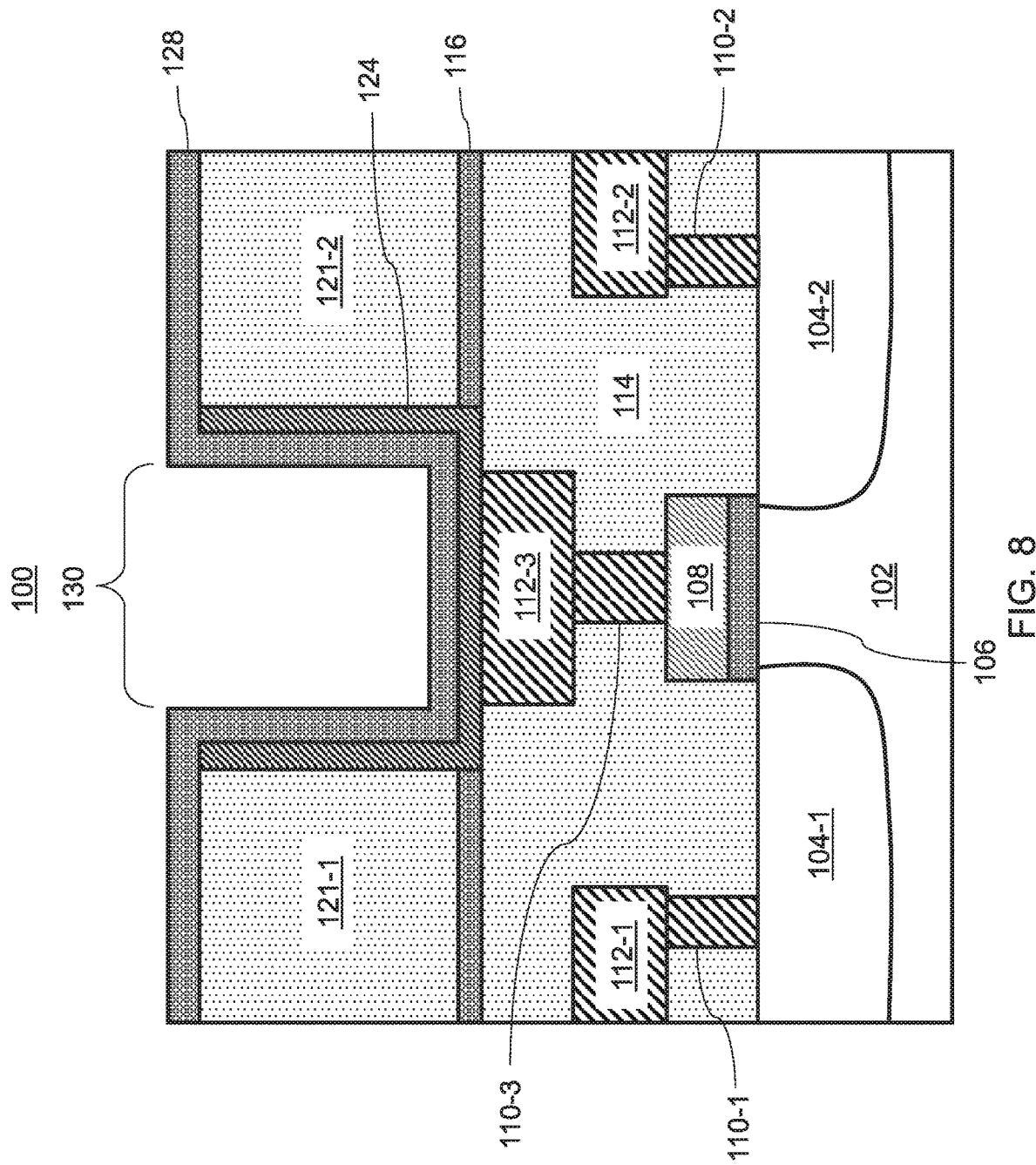
FIG. 8 is a cross-sectional view of the formation of a passivation layer to create a sawtooth macrowell from the sawtooth microwell during the fabrication of the semiconductor device, in accordance with an embodiment of the present invention.

With reference to FIG. 8, a passivation layer 128 is formed to create a sawtooth macrowell 130. The passivation layer 128 can be formed using any suitable process in accordance with the embodiments described herein. For example, the passivation layer 128 can be conformally deposited along exposed surfaces of the dielectric layer portions 121-1 and 121-2 and the conductive layer 124. The passivation layer 128 can have a thickness greater than that of the gate dielectric 106.

The passivation layer 128 can be used to, e.g., (1) prevent ions (e.g., sodium (Na) and/or potassium (K) ions) from getting into the underlying transistor and (2) serve as a sensing layer to absorb electric charges in analyte solution to the surface of the passivation layer 128. The passivation layer 128 can include any suitable material in accordance with the embodiments described herein. Examples of suitable materials that can be used to form the passivation layer 128 include, but are not limited to, a silicon nitride material (SiN), silicon oxynitride (SiON), metal oxides (e.g., aluminum oxides, tantalum oxides, hafnium oxides, titanium oxides, aluminum nitrides), polymers, organic nanodielectric materials, self-assembled monolayers (SAMs) such as, e.g., APTES (3-aminopropyltriethoxysilane), etc.

Although the passivation layer 128 can prevent ions from getting into the underlying transistor and can serve as a sensing layer to absorb electric charges in the analyte solution to the surface of the passivation layer 128, the passivation layer 128 can reduce the sensitivity of the underlying transistor.

For example, the passivation layer 128 can create a passivation capacitance ($C_p$) in series with a FET capacitance ($C_{FET}$). More specifically, as compared with the case without a passivation layer (e.g., analyte directly contacting the gate), the sensitivity of the underlying ISFET can be reduced by a factor of A, where A can be expressed as $A=C_p/(C_p+C_{FET})$. In the embodiment in which the passivation layer 128 has a thickness greater than that of the gate dielectric 106, $C_p$ can be less than $C_{FET}$, thereby resulting in sensitivity value of A of less than 1. Based on this, the sensitivity of the underlying transistor can be increased by increasing the value of $C_p$. There is a direct relationship between total capacitor surface area and $C_p$, such that the greater the total capacitor surface area, the larger the capacitance value of $C_p$. Accordingly, increasing the total capacitor surface area can result in enhanced sensitivity of the underlying transistor.

As mentioned above with reference to FIGS. 2 and 3, the sawtooth mask 120 used during the fabrication of the device 100 can increase total capacitor surface area as compared to non-sawtooth designs. That is, forming the sawtooth microwell 122 using the sawtooth mask 120, resulting in the sawtooth macrowell 130, can enhance the sensitivity of the underlying ISFET by increasing capacitor surface area as compared to non-sawtooth designs. For example, in the illustrative embodiment described above with reference to FIG. 3 in which the total capacitor surface area associated with the sawtooth mask 120 is 880 $\mu m^2$ and the total capacitor surface area associated with a non-sawtooth mask is 500 $\mu m^2$ (and assuming that $C_{FET}=10C_p$ without the sawtooth geometry), an approximate 1.6 fold capacitance increase of $C_p$ can be realized, which corresponds to an approximate 1.5 fold sensitivity enhancement.

Figure 9:
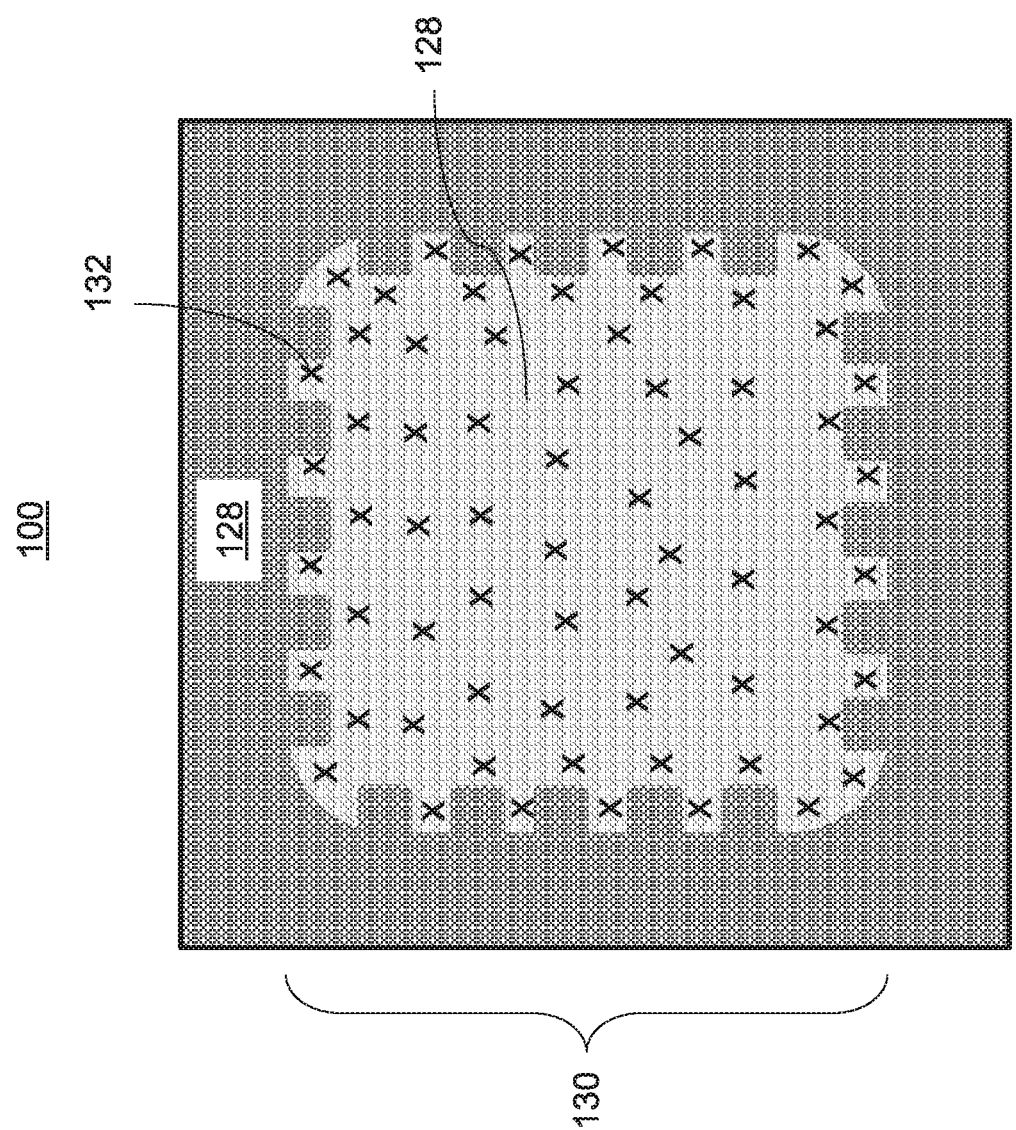
FIG. 9 is a top-down view of the introduction of an analyte solution into the sawtooth macrowell during the fabrication of the semiconductor device, in accordance with an embodiment of the present invention.

With reference to FIG. 9, a top-down view of the device 100 is provided illustrating the introduction of an analyte solution 132 into the sawtooth macrowell 130. After introducing analyte solution 132 into the sawtooth macrowell 130, a plurality of electric charges 134 located within the sawtooth macrowell 130 along the passivation layer 128, represented by "x" in FIG. 9, are also shown.

The term "analyte" is used herein to denote a substance (e.g., chemical or biological), or a chemical/biological constituent that can be subject to analyses and detection by ISFET sensing. That is, the analyte can include a chemical or biological material that has, or can generate, an electric charge in a solution (aqueous or non-aqueous (e.g., polar or non-polar)) such that the amount of electrical charge in the analyte solution 132 can be measured by the threshold voltage change of the underlying FET. Illustrative analytes that can be employed in the present include, but are not limited to, glucose, DNA, ions, etc. The analyte solution 132 can be introduced using any suitable techniques in accordance with the embodiments described herein. For example, in one embodiment, the analyte solution 132 can be pumped from an external reservoir (not shown) to the macrowell 130, where analysis and detection of the analyte in the analyte-containing solution occurs by the mechanism mentioned above. Alternatively, the ISFET can be used as a gas sensor or sense electrolyte sensor.

Figure 10:
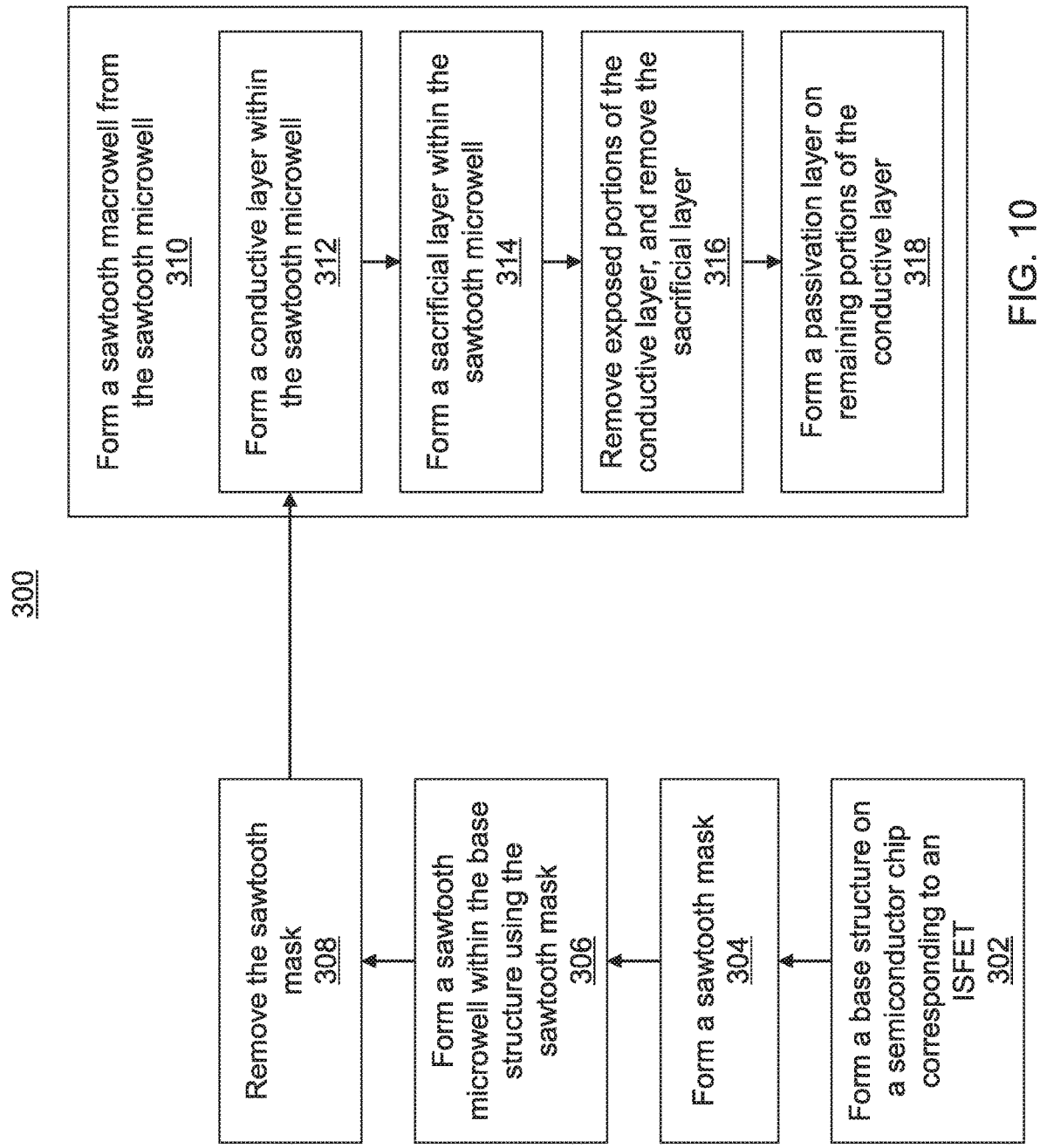
FIG. 10 is a block/flow diagram of a system/method for fabricating a semiconductor device including an ion-sensitive field-effect transistor (ISFET) with a sawtooth microwell to enhance sensitivity, in accordance with an embodiment of the present invention.

With reference to FIG. 10, a block/flow diagram is shown illustrating a system/method 300 for fabricating a semiconductor device including an ion-sensitive field-effect transistor (ISFET) with a sawtooth microwell, in accordance with an embodiment.

At block 302, a base structure is formed on a semiconductor chip corresponding to an ISFET. The semiconductor chip, or integrated circuit, can include a metal-oxide-semiconductor field-effect transistor (MOSFET) device. The MOSFET device can include a substrate, source/drain regions, a gate structure including a gate conductor layer formed on a gate dielectric layer, a plurality of contacts and back-end-of-line (BEOL) structures and dielectric material. Forming the base structure can include forming a protection layer on the semiconductor chip, and forming a dielectric layer on the protection layer. The protection layer can be a thin layer having a thickness from, e.g., about 3 nm to about 7 nm. More specifically, the protection layer can have a thickness of, e.g., about 5 nm. Further details regarding block 302 are described above with reference to FIG. 1.

At block 304, a sawtooth mask is formed. The sawtooth mask can include a plurality of micropillars forming "teeth" along the internal edges of the sawtooth mask. Each sawtooth can have a length that is substantially the same as its width (e.g., each sawtooth can have a substantially square shape). The sawtooth mask can be formed using any suitable process in accordance with the embodiments described herein.

At block 306, a sawtooth microwell is formed within the base structure using the sawtooth mask. More specifically, the sawtooth mask can be used to etch through the base structure to expose the semiconductor chip. Etching through the base structure to expose the semiconductor chip can include etching through the dielectric layer, stopping on the protection layer, and etching the protection layer. The etching of the dielectric layer results in the formation of dielectric layer portions.

Further details regarding blocks 304 and 306 are described above with reference to FIGS. 2 and 3.

At block 308, the sawtooth mask is removed. Any suitable process can be used to remove the sawtooth mask in accordance with the embodiments described herein.

At block 310, a sawtooth macrowell is formed from the sawtooth microwell.

For example, forming the sawtooth macrowell can include, at block 312, forming a conductive layer within the sawtooth microwell. Forming the conductive layer can include forming the conductive layer having portions along top surfaces of the dielectric layer portions and portions along surfaces of the sawtooth microwell. The conductive layer can include any suitable conductive material (e.g., metal) in accordance with the embodiments described herein. Examples of suitable materials that the conductive layer can be formed from include, but are not limited to, ruthenium (Ru), gold (Au), platinum (Pt), palladium (Pd), nickel (Ni), cobalt (Co), aluminum (Al), silver (Ag), etc. The conductive layer can be formed using any suitable process in accordance with the embodiments described herein. Examples of suitable processes that can be used to form the conductive layer include, but are not limited to, atomic layer deposition (ALD), chemical vapor deposition (CVD), physical vapor deposition (PVD), etc.

Forming the sawtooth macrowell can further include, at block 314, forming a sacrificial layer within the sawtooth microwell. Forming the sacrificial layer within the sawtooth microwell can include filling the sawtooth microwell with a sacrificial material, and planarizing and recessing the sacrificial material to expose the portions of the conductive layer along the top surfaces of the dielectric layer of the base structure. The sacrificial layer can include any suitable material in accordance with the embodiments described herein. For example, the sacrificial layer can include, e.g., amorphous silicon-germanium (aSiGe).

Forming the sawtooth macrowell can further include, at block 316, removing the exposed portions of the conductive layer, and removing the sacrificial layer. The exposed portions of the conductive layer and the sacrificial layer can be removed using any suitable process in accordance with the embodiments described herein.

Forming the sawtooth macrowell can further include, at block 318, forming a passivation layer on remaining portions of the conductive layer. The passivation layer can be formed using any suitable process in accordance with the embodiments described herein. For example, the passivation layer can be conformally deposited along exposed surfaces of dielectric layer portions and the remaining portions of the conductive layer. The passivation layer can have a thickness greater than that of the gate dielectric layer of the semiconductor chip.

The passivation layer can include any suitable material in accordance with the embodiments described herein. Examples of suitable materials that can be used to form the passivation layer include, but are not limited to, a silicon nitride material (SiN), silicon oxynitride (SiON), metal oxides (e.g., aluminum oxides, tantalum oxides, hafnium oxides, titanium oxides, aluminum nitrides), polymers, organic nanodielectric materials, self-assembled monolayers (SAMs) such as, e.g., APTES (3-aminopropyltriethoxysilane), etc.

Further details regarding blocks 308-318 are described above with reference to FIGS. 4-8.

At block 320, an analyte solution is introduced into the sawtooth macrowell. The introduction of the analyte solution can result in a plurality of electric charges located within the sawtooth macrowell along the passivation layer. The analyte solution can be introduced using any suitable techniques in accordance with the embodiments described herein. For example, in one embodiment, the analyte solution can be pumped from an external reservoir to the sawtooth macrowell, where analysis and detection of the analyte in the analyte-containing solution can occur. Alternatively, the ISFET can be used as a gas sensor or sense electrolyte sensor. Further details regarding block 320 are described above with reference to FIG. 9.

As described in detail above, ISFET sensitivity can be enhanced due to the increased capacitor surface area achieved by the sawtooth geometry of the sawtooth microwell. More specifically, the increased capacitor surface area corresponds to an increase in the passivation capacitance $C_p$. For example, assuming that $C_{FET}$ is ten times that of $C_p$ without the sawtooth microwell, a sensitivity enhancement of, e.g., about 1.5 fold can be achieved based on a capacitance increase of $C_p$ of, e.g., about 1.6 fold.

Having described preferred embodiments of a semiconductor device including an ion-sensitive field-effect transistor (ISFET) with enhanced sensitivity and a method of fabricating the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for fabricating a semiconductor device including an ion-sensitive field-effect transistor (ISFET) with enhanced sensitivity, comprising:
   forming a sawtooth microwell within a base structure formed on a semiconductor chip corresponding to the ISFET, including using a sawtooth mask to etch through the base structure to expose the semiconductor chip;
   removing the sawtooth mask; and
   forming a sawtooth macrowell from the sawtooth microwell.

2. The method of claim 1, further comprising forming the base structure on the semiconductor chip, including:
   forming a protection layer on the semiconductor chip; and
   forming a dielectric layer on the protection layer.

3. The method of claim 2, wherein the protection layer is formed to have a thickness of about 5 nm.

4. The method of claim 2, wherein forming the sawtooth microwell further includes using the sawtooth mask to etch through the dielectric layer to create respective dielectric layer portions, stopping on the protection layer, and etching the protection layer.

5. The method of claim 4, wherein forming the sawtooth macrowell further includes forming a conductive layer having respective portions along respective top surfaces of the respective dielectric layer portions and respective portions along surfaces of the sawtooth microwell.

6. The method of claim 5, wherein forming the sawtooth macrowell further includes:
   forming a sacrificial layer within the sawtooth microwell, including filling the sawtooth microwell with a sacrificial material and planarizing and recessing the sacrificial material to expose the respective portions of the conductive layer along the respective top surfaces of the respective dielectric layer portions;
   removing the exposed respective portions of the conductive layer; and
   removing the sacrificial layer.

7. The method of claim 6, wherein the sacrificial material includes amorphous silicon-germanium (aSiGe).

8. The method of claim 6, wherein forming the sawtooth macrowell further includes forming a passivation layer on remaining respective portions of the conductive layer.

9. The method of claim 1, further comprising introducing an analyte solution into the sawtooth macrowell.

10. A method for fabricating a semiconductor device including an ion-sensitive field-effect transistor (ISFET) with enhanced sensitivity, comprising:
    forming a base structure on a semiconductor chip corresponding to the ISFET, including forming a protection layer on the semiconductor chip, and forming a dielectric layer on the protection layer;
    forming a sawtooth microwell within the base structure, including using the sawtooth mask to etch through the base structure to expose the semiconductor chip by etching the dielectric layer to create respective dielectric layer portions, stopping on the protection layer, and etching the protection layer;
    removing the sawtooth mask; and
    forming a sawtooth macrowell from the sawtooth microwell.

11. The method of claim 10, wherein the protection layer is formed to have a thickness of about 5 nm.

12. The method of claim 10, wherein forming the sawtooth macrowell further includes forming a conductive layer having respective portions along respective top surfaces of the respective dielectric layer portions and respective portions along surfaces of the sawtooth microwell.

13. The method of claim 12, wherein forming the sawtooth macrowell further includes:
   forming a sacrificial layer within the sawtooth microwell, including filling the sawtooth microwell with a sacrificial material and planarizing and recessing the sacrificial material to expose the respective portions of the conductive layer along the respective top surfaces of the respective dielectric layer portions;
   removing the respective portions of the conductive layer; and
   removing the sacrificial layer.

14. The method of claim 13, wherein the sacrificial material includes amorphous silicon-germanium (aSiGe).

15. The method of claim 14, wherein forming the sawtooth macrowell further includes forming a passivation layer on remaining respective portions of the conductive layer to form the sawtooth macrowell.

16. The method of claim 10, further comprising introducing an analyte solution into the sawtooth macrowell.

17. A semiconductor device including an ion-sensitive field-effect transistor (ISFET) with enhanced sensitivity, comprising:
   a semiconductor chip;
   first and second protection layers disposed on the semiconductor chip;
   first and second dielectric layer portions disposed on the first and second protection layers, respectively; and
   a sawtooth macrowell disposed between the first and second dielectric layer portions.

18. The device of claim 17, wherein the first and second protection layers each have a thickness of about 5 nm.

19. The device of claim 17, wherein the sawtooth macrowell further includes a conductive layer and a passivation layer disposed on the conductive layer.

20. The device of claim 17, further comprising an analyte solution located within the sawtooth macrowell.

* * * * *